(12) United States Patent
Juni

(10) Patent No.: US 7,844,157 B2
(45) Date of Patent: Nov. 30, 2010

(54) OPTICAL WAVEGUIDE FOR LUMINESCENT DEVICE AND MANUFACTURING METHOD THEREOF

(75) Inventor: Noriyuki Juni, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 0 days.

(21) Appl. No.: 12/343,069

(22) Filed: Dec. 23, 2008

(65) Prior Publication Data

US 2009/0162021 A1 Jun. 25, 2009

Related U.S. Application Data

(60) Provisional application No. 61/021,701, filed on Jan. 17, 2008.

(30) Foreign Application Priority Data

Dec. 25, 2007 (JP) ............................. 2007-332570

(51) Int. Cl.
G02B 6/10 (2006.01)
(52) U.S. Cl. ...................................... 385/132; 385/129
(58) Field of Classification Search .......... 385/129–132
See application file for complete search history.

(56) References Cited

U.S. PATENT DOCUMENTS

| | | | | |
|---|---|---|---|---|
| 5,222,795 A | * | 6/1993 | Hed | ............................ 362/558 |
| 5,671,314 A | * | 9/1997 | Gregory et al. | ............. 385/128 |
| 6,807,353 B1 | * | 10/2004 | Fleming et al. | ............. 385/132 |
| 7,016,586 B2 | * | 3/2006 | Zoorob et al. | ................ 385/129 |
| 7,541,058 B2 | * | 6/2009 | Chan et al. | ................... 385/129 |
| 2003/0223692 A1 | * | 12/2003 | Ikarashi et al. | ................ 385/38 |
| 2004/0005109 A1 | | 1/2004 | Tsushima et al. | |
| 2007/0172970 A1 | * | 7/2007 | Uya | ............................ 438/22 |
| 2007/0237963 A1 | | 10/2007 | Hikita | |

FOREIGN PATENT DOCUMENTS

| | | |
|---|---|---|
| DE | 10 2004 028 814 A1 | 1/2006 |
| EP | 1 842 849 A1 | 10/2007 |

(Continued)

OTHER PUBLICATIONS

European Search Report dated Mar. 11, 2009, issued in corresponding European Patent Application No. 08022186.4.

(Continued)

*Primary Examiner*—Charlie Peng
(74) *Attorney, Agent, or Firm*—Westerman, Hattori, Daniels & Adrian, LLP

(57) ABSTRACT

An optical waveguide for a luminescent device capable of efficiently leading light beams propagating through a core outwardly to cause light emission, and a manufacturing method thereof. The optical waveguide for a luminescent device includes an under cladding layer 2, a core 3 formed in a predetermined portion of a surface of the under cladding layer 2, and an over cladding layer 4 formed on the surface of the under cladding layer 2 so as to cover the core 3. The over cladding layer 4 includes holes 41 formed in a predetermined portion thereof and extending to the core 3. The holes 41 are filled with a coating material 5 having a refractive index not less than that of the above-mentioned core 3.

9 Claims, 5 Drawing Sheets

FOREIGN PATENT DOCUMENTS

| | | |
|---|---|---|
| JP | 3-296089 A | 12/1991 |
| JP | 9-281352 A | 10/1997 |
| JP | 2814684 B2 | 8/1998 |
| JP | 2006011046 A | 1/2006 |
| JP | 2007-258038 A | 10/2007 |

OTHER PUBLICATIONS

Japanese Office Action dated Feb. 16, 2010 (mailing date), issued in corresponding Japanese Patent Application No. 2007-332570.

* cited by examiner

[FIG. I]
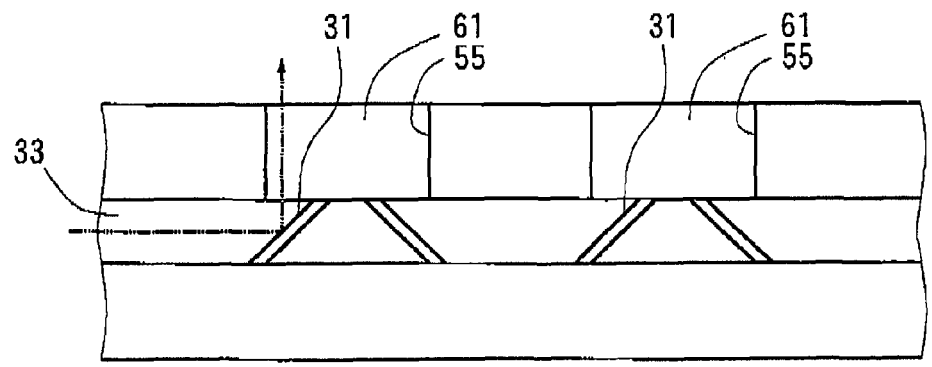
[FIG. II]
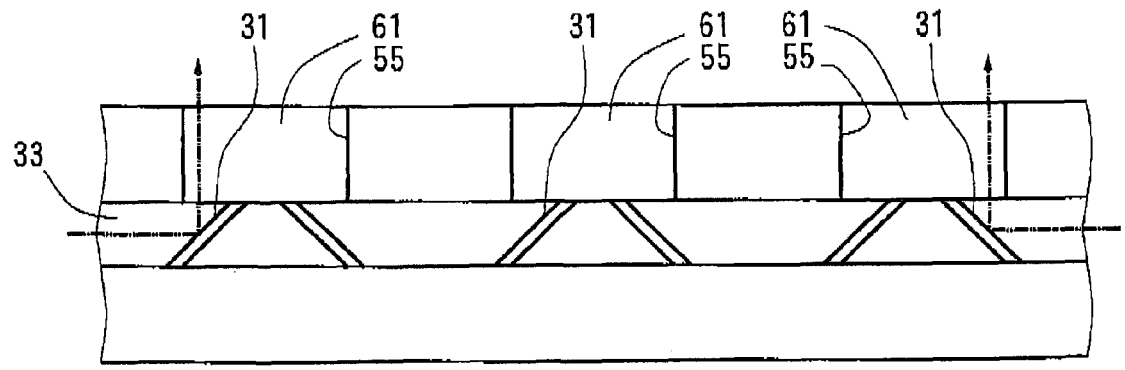

OPTICAL WAVEGUIDE FOR LUMINESCENT DEVICE AND MANUFACTURING METHOD THEREOF

RELATED APPLICATIONS

This application claims the benefit of U.S. Provisional Application No. 61/021,701, filed Jan. 17, 2008, which is hereby incorporated by reference.

BACKGROUND OF THE INVENTION

1. Field of the Invention

The present invention relates to an optical waveguide for a luminescent device for ornamental or other purposes, and a manufacturing method thereof.

2. Description of the Related Art

Heretofore, a light emitting board using an optical waveguide has been proposed as a light emitting board which can be used for ornamental objects and the like (see Japanese Patent No. 2814684). This light emitting board includes a linear light guiding portion (a core) formed on a substrate, and a low refractive portion (an over cladding layer) formed on the above-mentioned substrate so as to cover the light guiding portion (the core). The refractive indices of the above-mentioned substrate and the low refractive portion (the over cladding layer) are lower than the refractive index of the light guiding portion (the core). A light scatterer is dispersed in the above-mentioned light guiding portion (the core) to cause light beams propagating through the above-mentioned light guiding portion (the core) to change their optical paths upon impingement upon the above-mentioned light scatterer. Some of the light beams which change their optical paths toward the surface of the above-mentioned low refractive portion (the over cladding layer) cause the light emission from the above-mentioned light emitting board in a linear configuration which is the configuration of the light guiding portion (the core).

In the above-mentioned light emitting board, however, the low refractive portion (the over cladding layer) having the refractive index lower than that of the light guiding portion (the core) covers the light guiding portion (the core) through which the light beams propagate. It is therefore difficult for the light beams propagating through the above-mentioned light guiding portion (the core) to travel toward the low refractive portion (the over cladding layer). In other words, the above-mentioned light emitting board is low in outward light emission efficiency.

SUMMARY OF THE INVENTION

In view of the foregoing, it is an object of the present invention to provide an optical waveguide for a luminescent device capable of efficiently leading light beams propagating through a core outwardly to cause light emission, and a manufacturing method thereof.

To accomplish the above-mentioned object, a first aspect of the present invention is intended for an optical waveguide for a luminescent device comprising: a planar body, a core formed in a predetermined portion of a surface of the body, and an over cladding layer formed on the surface of said body so as to cover the core, wherein said over cladding layer includes a hole formed in a predetermined portion thereof and extending to the core, and wherein said hole is filled with a coating material having a refractive index not less than that of said core.

A second aspect of the present invention is intended for a method of manufacturing the above-mentioned optical waveguide for a luminescent device, comprising the steps of: forming a core in a predetermined portion of a surface of a planar body; forming a photosensitive resin layer on the surface of said body and then exposing the photosensitive resin layer to light except where a hole is to be formed to form an exposed portion of the photosensitive resin layer into an over cladding layer; removing said unexposed portion to form a void resulting from the removal into the hole; and potting a coating material having a refractive index not less than that of said core into the hole and then hardening the coating material to fill said hole with the coating material.

In the optical waveguide for a luminescent device according to the present invention, the hole extending to the core is formed in the predetermined portion of the over cladding layer, and the refractive index of the coating material filling the hole is not less than that of the above-mentioned core. Thus, at least some of the light beams propagating through the core travel into the coating material without resistance and are then emitted outwardly from the surface of the coating material. In other words, the optical waveguide for a luminescent device according to the present invention is capable of efficiently leading at least some of the light beams propagating through the core outwardly to cause light emission.

In particular, when light scattering particles are dispersed in the coating material filling the above-mentioned hole, the light beams passing through the coating material are refracted or reflected by the light scattering particles and are scattered. The light beams being scattered are emitted to the outside. This improves the visibility of the emitted light beams.

Additionally, when the surface of the coating material filling the above-mentioned hole is in the form of an uneven rough surface, the light beams emitted from the surface of the coating material is refracted in random directions by the uneven rough surface and are scattered. This improves the visibility of the emitted light beams.

The method of manufacturing the optical waveguide for a luminescent device according to the present invention includes: exposing the photosensitive resin layer formed so as to cover the core to light, except where the hole is to be formed, to form the exposed portion of the photosensitive resin layer into the over cladding layer; removing the unexposed portion to form the void resulting from the removal into the hole; and potting the coating material having the refractive index not less than that of the core into the hole and then hardening the coating material to fill the above-mentioned hole with the coating material. Thus, the method provides the optical waveguide for a luminescent device according to the present invention capable of efficiently leading at least some of the light beams propagating through the core outwardly to cause light emission.

BRIEF DESCRIPTION OF DRAWINGS

FIG. 1 is a perspective view schematically showing a first preferred embodiment of an optical waveguide for a luminescent device according to the present invention.

FIG. 2 is a sectional view taken along the line X-X of FIG. 1.

DETAILED DESCRIPTION

Figure 3:
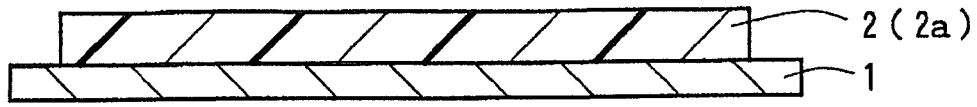
FIGS. 3(a) to (e) are views schematically illustrating a method of manufacturing the above-mentioned optical waveguide for a luminescent device.
Figure 3:
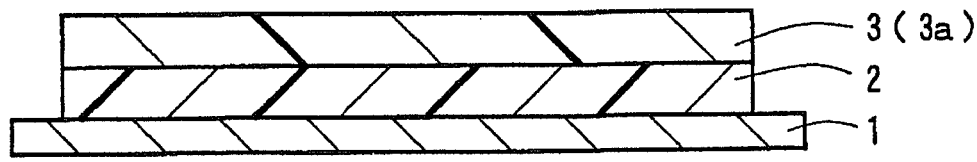
Figure 3:
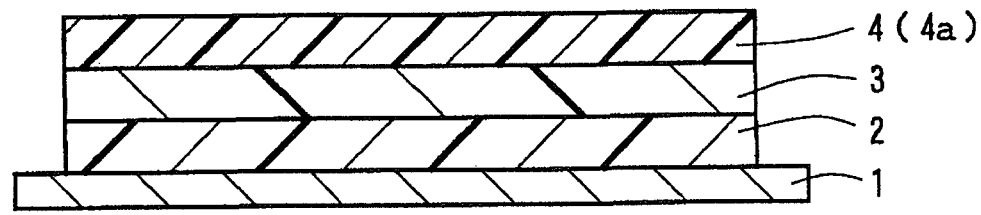
Figure 3:
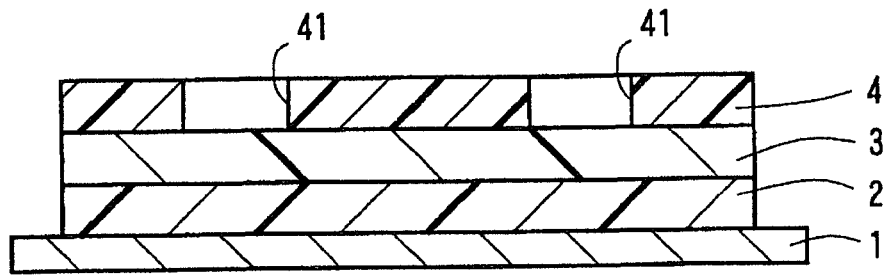
Figure 3:
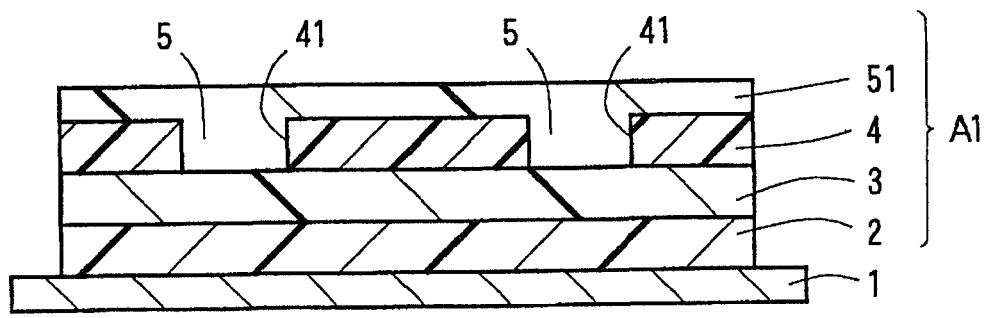

Preferred embodiments according to the present invention will now be described in detail with reference to the drawings.

FIGS. 1 and 2 show a first preferred embodiment of an optical waveguide for a luminescent device according to the present invention. The optical waveguide A1 for a luminescent device according to this preferred embodiment includes an under cladding layer (a planar body) 2, a core 3 formed in a predetermined pattern in a predetermined portion of the surface of the under cladding layer 2 and serving as a passageway for light beams L, and an over cladding layer 4 formed on the surface of the above-mentioned under cladding layer 2 so as to cover the core 3. Holes 41 extending to the core 3 are partially formed in the above-mentioned over cladding layer 4. The holes 41 are filled with a coating material 5 having a refractive index not less than that of the above-mentioned core 3. Further, in this preferred embodiment, a coating layer 51 in the form of a layer of the above-mentioned coating material 5 is formed on the surface of the over cladding layer 4. The refractive indices of the under cladding layer 2, core 3 and over cladding layer 4 described above are as follows: the refractive indices of the under cladding layer 2 and over cladding layer 4 are lower than the refractive index of the core 3, as in typical optical waveguides.

When light beams L are propagated through the core 3 of the above-mentioned optical waveguide A1 for a luminescent device, at least some of the light beams L propagating through the core 3 travel into the coating material 5 filling the above-mentioned holes 41 without resistance and are then emitted outwardly from surface portions of the coating layer 51 positioned over the holes 41 and their peripheral portions because the refractive index of the coating material 5 is not less than that of the core 3.

An example of a method of manufacturing such an optical waveguide A1 for a luminescent device will be described.

First, a planar base 1 (as shown in FIG. 3(a)) for use in manufacturing the above-mentioned optical waveguide A1 for a luminescent device (see FIG. 1) is prepared. Examples of a material for the formation of the base 1 used herein include glass, quartz, silicon, resins, metal and the like. The thickness of the base 1 is, for example, in the range of 20 μm (for a film-like base 1) to 5 mm (for a plate-like base 1).

Next, as shown in FIG. 3(a), a varnish prepared by dissolving a photosensitive resin in a solvent, which serves as a material for the formation of the under cladding layer 2, is applied to a predetermined region on the above-mentioned base 1. The application of the varnish is achieved, for example, by a spin coating method, a dipping method, a casting method, an injection method, an ink jet method and the like. Then, the varnish is dried by a heating treatment at 50° C. to 120° C. for 10 to 30 minutes. This provides a photosensitive resin layer 2a which is to be formed into the under cladding layer 2.

Next, the above-mentioned photosensitive resin layer 2a is exposed to irradiation light. Examples of the irradiation light for the above-mentioned exposure used herein include visible light, ultra violet light, infrared light, X-rays, alpha rays, beta rays, gamma rays and the like. Preferably, ultra violet light is used. This is because the use of ultra violet light achieves irradiation with large energy to provide a high rate of hardening, and an irradiation apparatus therefor is small in size and inexpensive to achieve the reduction in production costs. A light source of the ultra violet light may be, for example, a low-pressure mercury-vapor lamp, a high-pressure mercury-vapor lamp, an ultra-high-pressure mercury-vapor lamp and the like. The dose of the ultra violet light is typically 10 to 10000 mJ/cm$^2$, preferably 50 to 3000 mJ/cm$^2$.

After the above-mentioned exposure, a heating treatment is performed to complete a photo reaction. This heating treatment is performed at 80° C. to 250° C., preferably at 100° C. to 200° C., for 10 seconds to two hours, preferably for five minutes to one hour. This forms the above-mentioned photosensitive resin layer 2a into the under cladding layer 2. The thickness of the under cladding layer 2 (the photosensitive resin layer 2a) is typically in the range of 1 to 50 μm, preferably in the range of 5 to 30 μm.

Next, as shown in FIG. 3(b), a photosensitive resin layer 3a which is to be formed into the core 3 is formed on the surface of the above-mentioned under cladding layer 2. The formation of this photosensitive resin layer 3a is carried out in a manner similar to the method for the formation of the photosensitive resin layer 2a formed into the under cladding layer 2 described with reference to FIG. 3(a). A material for the formation of the core 3 used herein is a material having a refractive index higher than the refractive indices of the materials for the formation of the above-mentioned under cladding layer 2 and the over cladding layer 4 to be described later (with reference to FIG. 3(d)). This adjustment of the refractive indices may be made, for example, by adjusting the selection of the types of the materials for the formation of the above-mentioned under cladding layer 2, core 3 and over cladding layer 4, and the composition ratio thereof.

Next, an exposure mask formed with an opening pattern corresponding to the pattern of the core 3 is placed over the above-mentioned photosensitive resin layer 3a. Then, the above-mentioned photosensitive resin layer 3a is exposed to irradiation light through the exposure mask. Thereafter, a heating treatment is performed. The exposure and the heating treatment are carried out in a manner similar to the method for the formation of the under cladding layer 2 described with reference to FIG. 3(a).

Subsequently, development is performed using a developing solution to dissolve away an unexposed portion of the above-mentioned photosensitive resin layer 3a, thereby forming the photosensitive resin layer 3a remaining on the under cladding layer 2 into the pattern of the core 3. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution in the remaining photosensitive resin layer 3a formed in the pattern of the core 3 is removed by a heating treatment. This heating treatment is typically performed at 80° C. to 12° C. for 10 to 30 minutes. Thus, the remaining photosensitive resin layer 3a formed in the pattern of the above-mentioned core 3 is formed into the core 3. The thickness of the core 3 (the photosensitive resin layer 3a) is typically in the range of 20 to 150 μm, preferably in the range of 40 to 100 μm. The width of the core 3 is typically in the range of 10 to 500 μm, preferably in the range of 20 to 300 μm.

Then, as shown in FIG. 3(c), a photosensitive resin layer 4a which is to be formed into the over cladding layer 4 (with reference to FIG. 3(d)) is formed on the surface of the above-mentioned under cladding layer 2 so as to cover the above-mentioned core 3. The formation of this photosensitive resin layer 4a is carried out in a manner similar to the method for the formation of the photosensitive resin layer 2a formed into the under cladding layer 2 described with reference to FIG. 3(a).

Next, an exposure mask formed with an opening pattern corresponding to the pattern of the over cladding layer 4 (with reference to FIG. 3(d)) is placed over the above-mentioned photosensitive resin layer 4a. Then, the above-mentioned photosensitive resin layer 4a is exposed to irradiation light through the exposure mask. Thereafter, a heating treatment is performed. The exposure and the heating treatment are carried out in a manner similar to the method for the formation of the under cladding layer 2 described with reference to FIG. 3(a). The pattern of the above-mentioned over cladding layer 4 (the opening pattern of the exposure mask) is a pattern such that a portion except where the above-mentioned holes 41 (see FIG. 1) are to be formed is formed into the over cladding layer 4, as shown in FIG. 3(d).

Subsequently, as shown in FIG. 3(d), development is performed using a developing solution to dissolve away an unexposed portion of the above-mentioned photosensitive resin layer 4a, thereby forming the photosensitive resin layer 4a remaining on the surfaces of the under cladding layer 2 and core 3 into the pattern of the above-mentioned over cladding layer 4. At this time, voids resulting from the removal of the above-mentioned unexposed portion are formed into the holes 41 extending to the core 3. Thereafter, the developing solution in the remaining photosensitive resin layer 4a is removed by a heating treatment. The above-mentioned development and the heating treatment are carried out in a manner similar to the method for the formation of the core 3 described with reference to FIG. 3(b). Thus, the remaining photosensitive resin layer 4a formed in the pattern of the above-mentioned over cladding layer 4 is formed into the over cladding layer 4. The thickness of the over cladding layer 4 (the photosensitive resin layer 4a) (a thickness as measured from the surface of the core 3) is typically in the range of 3 to 40 μm, preferably in the range of 5 to 10 μm. Examples of the opening shape of the above-mentioned holes (the voids resulting from the removal of the unexposed portion of the above-mentioned photosensitive resin layer 4a) 41 are a circular shape, a polygonal shape, a linear shape along the core 3 and the like. The dimensions of the holes 41 are as follows: typically, the width thereof is in the range of 50 to 5000 μm and the length thereof is 50 to 5000 μm; preferably, the width thereof is in the range of 100 to 3000 μm and the length thereof is 100 to 3000 μm.

Then, as shown in FIG. 3(e), a varnish prepared by dissolving a resin and the like to be described below in a solvent, which serves as a material for the formation of the coating material 5, is applied to the surface of the above-mentioned over cladding layer 4. At the same time, the above-mentioned holes (the voids resulting from the removal of the unexposed portion of the above-mentioned photosensitive resin layer 4a) 41 are filled with the varnish. The application of the varnish is achieved, for example, by a spin coating method, a dipping method, a casting method, an injection method, an ink jet method and the like. Next, depending on the material of the above-mentioned coating material 5 to be described below, an appropriate method (heating treatment, irradiation with ultra violet light or the like) is executed to harden the material for the formation of the above-mentioned coating material 5, thereby forming the coating material 5 and the coating layer 51. The thickness of the coating layer 51 (a thickness as measured from the surface of the core 3) is typically in the range of 5 to 100 μm, preferably in the range of 10 to 50 μm.

The material of the above-mentioned coating material 5 used herein is required only to have a refractive index not less than that of the core 3. Examples of the material of the above-mentioned coating material 5 used herein include resins similar to those for the core 3, thermosetting resins, thermoplastic resins, engineering plastics, radiation curable resins and the like. Examples of the above-mentioned thermosetting resins include phenolic resins, urea resins, imides, polyimide resins, melamine resins, unsaturated polyesters, diallyl phthalate resins, xylene resins, alkyl benzene resins, epoxy resins, epoxy acrylate resins, silicon resins and the like. Examples of the above-mentioned thermoplastic resins include fluororesins, vinyl chloride resins, vinylidene chloride resins, polyethylenes, chlorinated polyolefins, polypropylenes, modified polyolefins, polyvinyl acetates, ethylene-ethyl acrylate copolymers, polystyrenes, ABS resins, polyamides, (meth)acrylic resins, polyacetals, polycarbonates, cellulose-based resins, polyvinyl alcohols and the like. Examples of the above-mentioned engineering plastics include polyimides, polycarbodiimides, ionomer resins, polyphenylene oxides, polymethylpentenes, poly-allyl sulfones, poly-allyl ethers, polyphenylene sulfides, polysulfones, polyethylene terephthalates, polybutylene terephthalates, polytetramethylene terephthalates and the like. Examples of the above-mentioned radiation curable resins include ultra violet curable resins, electron beam curable resins and the like.

In this manner, the optical waveguide A1 for a luminescent device including the under cladding layer 2, the core 3, the over cladding layer 4, the coating material 5 and the coating layer 51 is formed on the base 1.

Thereafter, the above-mentioned optical waveguide A1 for a luminescent device may be used after being removed from the base 1 or be used together with the base 1 without being removed. For the removal, the lower surface of the base 1 is initially brought into contact with a vacuum suction stage (not shown), and the base 1 is fixed thereon by air suction. Next, a vacuum suction machine (not shown) adheres to the upper surface of the coating layer 51 under suction to lift an adhering portion thereof in this state. This removes the under cladding layer 2 of the optical waveguide A1 for a luminescent device from the base 1, with the coating material 5, the over cladding layer 4, the core 3 and the under cladding layer 2 as well as the coating layer 51 bonded together. The adhesive force between the base 1 and the under cladding layer 2 is smaller than the adhesive forces between the coating layer 51 and the over cladding layer 4, between the over cladding layer 4 and the core 3 and between the over cladding layer 4 and the under cladding layer 2 because of the materials thereof. Thus, the above-mentioned process easily accomplish the removal.

Figure 4:
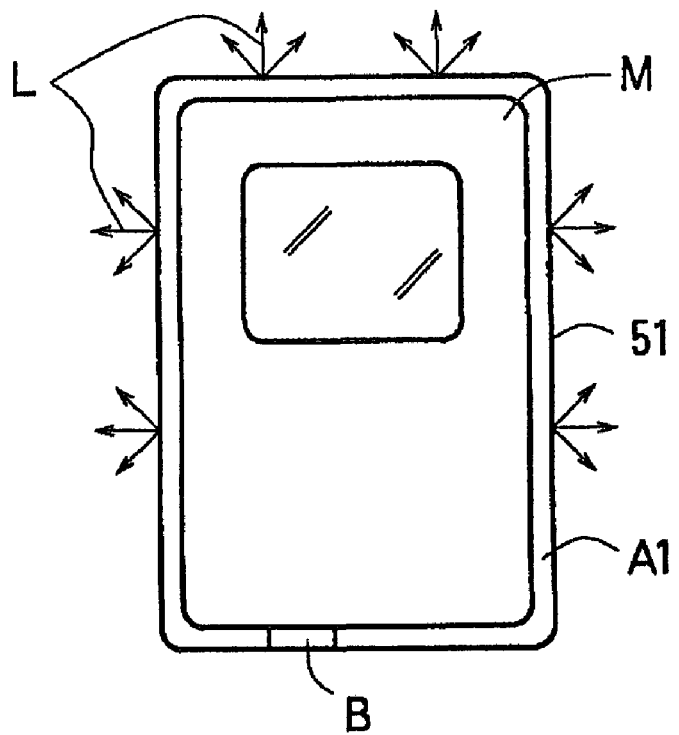
FIGS. 4(a) and (b) are views schematically illustrating examples of the use of the above-mentioned optical waveguide for a luminescent device.
Figure 4:
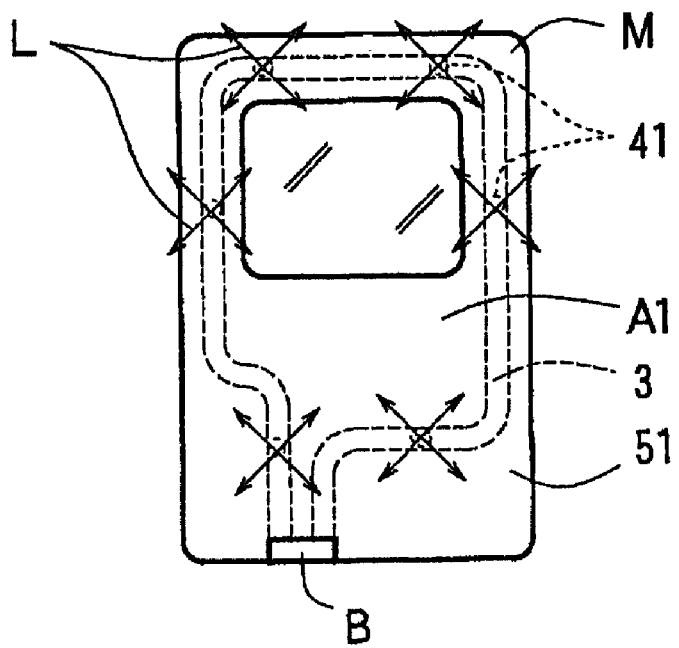

The above-mentioned optical waveguide A1 for a luminescent device may be used as a luminescent device by connecting a light source to an end of the core 3 and providing a control circuit for turning the light source on and off, a power supply and the like. For example, an incoming call is indicated by the light emission from the above-mentioned optical waveguide A1 for a luminescent device when the above-mentioned optical waveguide A1 for a luminescent device is affixed to a peripheral side surface of a mobile device M and the like as shown in FIG. 4(a) or affixed to the front surface of the mobile device M and the like as shown in FIG. 4(b) in such a manner that the coating layer 51 faces outward and the above-mentioned light source is turned on in response to the incoming call. In FIG. 4(a), the above-mentioned optical waveguide A1 for a luminescent device is affixed so that the longitudinal direction of the core 3 extends along the periphery of the side surfaces of the mobile device M and the like, and the optical waveguide A1 for a luminescent device is shown as thicker for the sake of clarity. In FIG. 4(b), the core 3 is in the form of a ring as seen in plan view, and the core 3 is also shown as thicker. In FIGS. 4(a) and (b), the reference character B designates a light emission controller including the above-mentioned light source, control circuit and the like. When the optical waveguide A1 for a luminescent device is used as such a luminescent device, the light for emission is preferably visible light. Examples of the source of the light include a light-emitting diode, a semiconductor laser and the like. The use of a plurality of light sources having different light colors allows changes in the color pattern of the light to be emitted.

Figure 5:
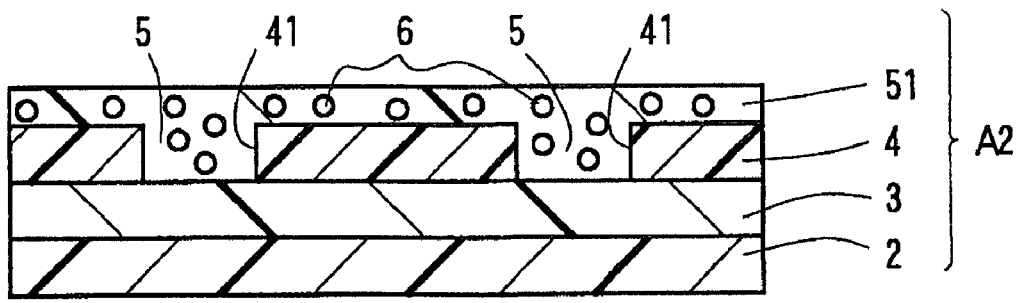
FIG. 5 is a sectional view schematically showing a second preferred embodiment of the optical waveguide for a luminescent device according to the present invention.

FIG. 5 shows a second preferred embodiment of the optical waveguide for a luminescent device according to the present invention. In the optical waveguide A2 for a luminescent device according to the second preferred embodiment, light scattering particles 6 are dispersed in the coating material 5 which fills the above-mentioned holes 41. Except for this, the second preferred embodiment is similar to the first preferred embodiment described above. Like reference numerals and characters are used to designate parts similar to those of the first preferred embodiment.

In the optical waveguide A2 for a luminescent device according to the second preferred embodiment, the light beams L coming into the coating material 5 are refracted or reflected by the above-mentioned light scattering particles 6 and are scattered. The light beams L being scattered are emitted to the outside. This improves the visibility of the emitted light beams L.

Examples of the above-mentioned light scattering particles 6 include silica particles, alumina particles, silicone particles, titania particles, zirconia particles, plastic particles, liquid crystal particles, air bubbles (hollow particles) and the like. These are used either alone or in combination. Preferably, the average particle size of the light scattering particles 6 is in the range of 0.1 to 50 μm from the viewpoint of the excellent light scattering property thereof. The average particle size is the average of the particle diameters of ten arbitrary light scattering particles 6. The particle diameter of each of the light scattering particles 6 is the maximum diameter thereof measured under a microscope. A method of dispersing the above-mentioned light scattering particles 6 in the coating material 5 includes previously mixing the above-mentioned light scattering particles 6 in the material for the formation of the coating material 5, and applying the material for the formation of the coating material 5 in a manner as mentioned above. The mixing ratio is preferably not greater than 30 parts by volume of the light scattering particles 6 per 100 parts by volume of the material for the formation of the coating material 5 from the viewpoint of the excellent light scattering property thereof.

Figure 6:
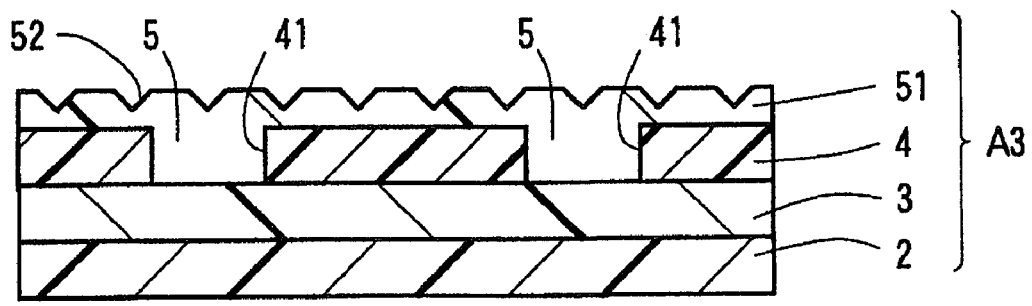
FIG. 6 is a sectional view schematically showing a third preferred embodiment of the optical waveguide for a luminescent device according to the present invention.

FIG. 6 shows a third preferred embodiment of the optical waveguide for a luminescent device according to the present invention. In the optical waveguide A3 for a luminescent device according to the third preferred embodiment, the surface of the coating layer 51 from which the light beams L are emitted is an uneven rough surface 52. Except for this, the third preferred embodiment is similar to the first preferred embodiment described above. Like reference numerals and characters are used to designate parts similar to those of the first preferred embodiment.

In the optical waveguide A3 for a luminescent device according to the third preferred embodiment, the light beams L emitted from the surface of the coating layer 51 are refracted in random directions by the unevenness of the surface of the coating layer 51 and are scattered. This improves the visibility of the emitted light beams L. Since surface portions of the coating layer 51 from which the light beams L are emitted are only the portions of the coating layer 51 positioned over the holes 41 and their peripheral portions, only the surface portions of the coating layer 51 from which the light beams L are emitted may be formed as the uneven rough surface 52.

Exemplary methods of forming the surface of the above-mentioned coating layer 51 as the uneven rough surface 52 include a method of scratching the surface of the coating layer 51 with sandpaper and the like after the coating layer 51 is formed, a laser processing method, a method of molding with a die, and the like.

Figure 7:
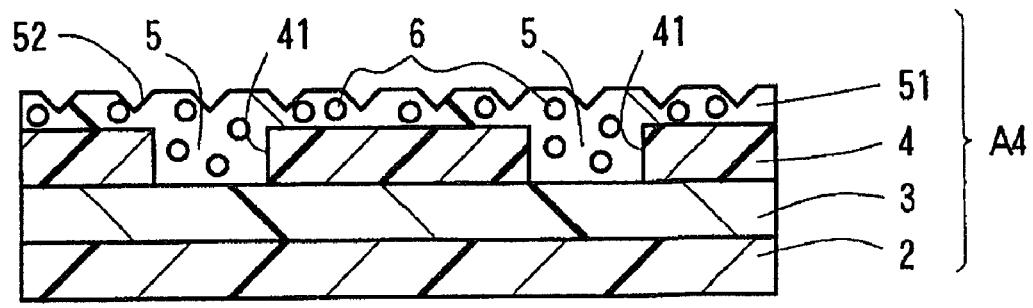
FIG. 7 is a sectional view schematically showing a fourth preferred embodiment of the optical waveguide for a luminescent device according to the present invention.

FIG. 7 shows a fourth preferred embodiment of the optical waveguide for a luminescent device according to the present invention. The optical waveguide A4 for a luminescent device according to the fourth preferred embodiment is a combination of the second preferred embodiment (see FIG. 5) and the third preferred embodiment (see FIG. 6) described above. Specifically, the light scattering particles 6 are dispersed in the coating material 5 which fills the above-mentioned holes 41, and the surface of the coating layer 51 is the uneven rough surface 52. Except for this, the fourth preferred embodiment is similar to the second and third preferred embodiments described above. Like reference numerals and characters are used to designate parts similar to those of the second and third preferred embodiments.

The optical waveguide A4 for a luminescent device according to the fourth preferred embodiment produces synergistic effects between the light scattering particles 6 and the uneven rough surface 52 to increase the scattering of the emitted light beams L, thereby further improving the visibility of the light beams L.

Figure 8:
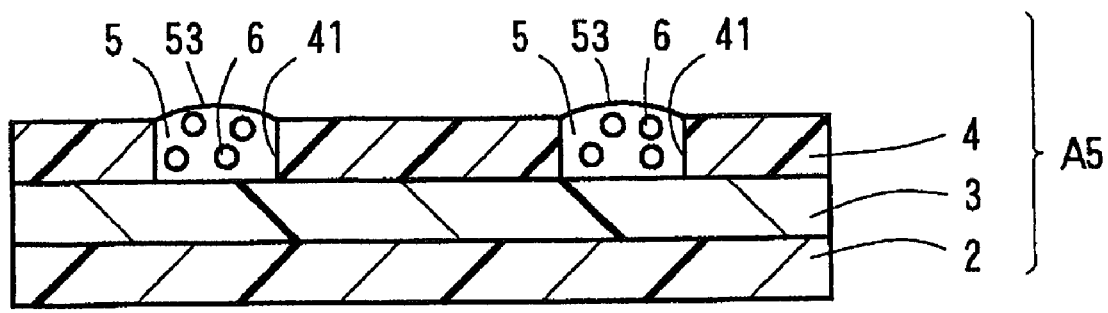
FIG. 8 is a sectional view schematically showing a fifth preferred embodiment of the optical waveguide for a luminescent device according to the present invention.

FIG. 8 shows a fifth preferred embodiment of the optical waveguide for a luminescent device according to the present invention. In the optical waveguide A5 for a luminescent device according to the fifth preferred embodiment, the coating material 5 in the above-mentioned second preferred embodiment (see FIG. 5) is formed only in the holes 41 formed in the over cladding layer 4, and the coating layer 51 is not formed on the surface of the over cladding layer 4. Except for this, the fifth preferred embodiment is similar to the second preferred embodiment described above. Like reference numerals and characters are used to designate parts similar to those of the second preferred embodiment.

An exemplary method of forming the coating material 5 only in the above-mentioned holes 41 in the fifth preferred embodiment includes a method of potting the material for the formation of the coating material 5 into the above-mentioned holes 41 (a method of filling the holes 41 with the material fed from a tip of a thin tube). This provides the surface of the coating material 5 in the form of part of a spherical surface or a convexly curved surface 53 close thereto. The light beams L emitted from the surface of the coating material 5 are refracted in various directions by the convexly curved surface 53 at the surface of the coating material 5 and are scattered. This improves the visibility of the emitted light beams L.

In the first preferred embodiment (see FIG. 2), the third preferred embodiment (see FIG. 6) and the fourth preferred embodiment (see FIG. 7) described above, the coating material 5 may be formed only in the holes 41 formed in the over cladding layer 4 in a manner similar to the fifth preferred embodiment.

In forming the holes 41 for the formation of the coating material 5 in the over cladding layer 4, a photosensitive resin is used as the material of the over cladding layer 4, and is exposed to light and then developed in the above-mentioned preferred embodiments. However, other materials and other methods may be used. For example, the over cladding layer 4 formed with the holes 41 for the formation of the coating material 5 may be formed using other resins as the material thereof by laser processing, etching, printing, die molding and the like.

In forming the under cladding layer 2, a photosensitive resin is used as the material of the under cladding layer 2, and the formation of the under cladding layer 2 is accomplished by exposure to light and development in the above-mentioned preferred embodiments. However, other materials and other methods may be used. For example, a thermosetting resin such as polyimide resin, epoxy resin and the like may be used as the material of the under cladding layer 2, and the under cladding layer 2 may be formed by applying a varnish prepared by dissolving the thermosetting resin in a solvent, and thereafter performing a heating treatment (typically at 300° C. to 400° C. for 60 to 180 minutes) to harden the thermosetting resin, or by other methods.

Further, a photosensitive resin is used to form the under cladding layer 2 in the above-mentioned preferred embodiments. However, other materials may be used. A resin film may be used as the under cladding layer 2. Alternatively, a substrate with a metal film or a metal thin film formed on the surface thereof may be used in place of the under cladding layer 2 so that the surface of the metal material functions as a surface for reflecting the light beams L propagating through the core 3.

Next, inventive examples of the present invention will be described. It should be noted that the present invention is not limited to the inventive examples.

Example 1

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (1), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3',4'-epoxycyclohexyl-carboxylate (CELLOXIDE 2081 manufactured by Daicel Chemical Industries, Ltd.) (Component C), and 2 parts by weight of a 50% propione carbonate solution of 4,4'-bis[di($\beta$-hydroxyethoxy)phenylsulfinio]phenyl-sulfide-bis-hexa fluoroantimonate (component D).

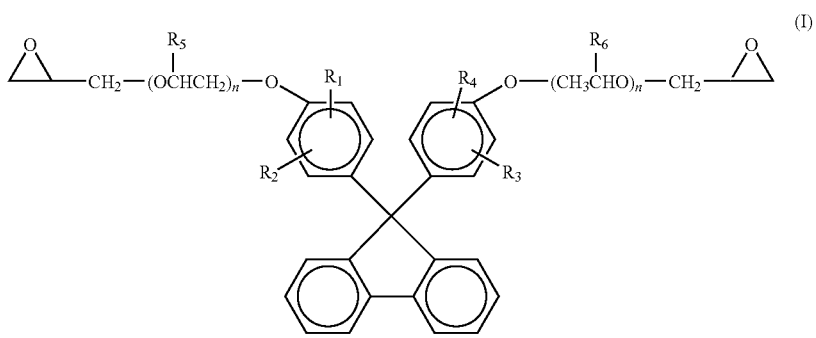

(I)

wherein $R_1$ to $R_6$ are hydrogen atoms, and n=1.

Material for Formation of Core

A material for formation of a core was prepared by dissolving 70 parts by weight of the aforementioned component A, 30 parts by weight of 1,3,3-tris{4-[2-(3-oxetanyl)]butoxyphenyl}butane and one part by weight of the aforementioned component D in 28 parts by weight of ethyl lactate.

Material for Formation of Coating Material (Coating Layer)

A material similar to the material for the formation of the above-mentioned core was prepared.

Production of Optical Waveguide for Luminescent Device

The material for the formation of the above-mentioned under cladding layer was applied to the surface of a polyethylene naphthalate (PEN) film [100 mm×100 mm×188 μm (thick)] by a spin coating method. Thereafter, exposure by the use of irradiation with ultra violet light at 2000 mJ/cm² was performed. Subsequently, a heating treatment was performed at 100° C. for 15 minutes to form the under cladding layer. The thickness of this under cladding layer was 25 μm when measured with a contact-type film thickness meter. The refractive index of this under cladding layer at a wavelength of 830 nm was 1.542.

Next, the material for the formation of the above-mentioned core was applied to the surface of the above-mentioned under cladding layer by a spin coating method. Thereafter, a drying process was performed at 100° C. for 15 minutes. Next, a synthetic quartz chrome mask (exposure mask) formed with an opening pattern identical in shape with the pattern of the core was placed over the resulting core material. Then, exposure by the use of irradiation with ultra violet light at 4000 mJ/cm² was performed by a contact exposure method from over the mask. Thereafter, a heating treatment was performed at 120° C. for 15-minutes. Next, development was carried out using an aqueous solution of γ-butyrolactone to dissolve away an unexposed portion. Thereafter, a heating treatment was performed at 120° C. for 30 minutes to form the core: The dimensions of the core in cross section were 100 μm in width×80 μm in height when measured with an SEM. The refractive index of the core at a wavelength of 830 nm was 1.588.

Next, the material for the formation of the above-mentioned over cladding layer was applied to the surface of the above-mentioned under cladding layer by a spin coating method so as to cover the above-mentioned core. Thereafter, a synthetic quartz chrome mask (exposure mask) formed with an opening pattern identical in shape with the pattern of the over cladding layer was positioned over the material for the formation of the over cladding layer. Then, exposure by the use of irradiation with ultra violet light at 2000 mJ/cm$^2$ was performed by a contact exposure method from above the mask. Thereafter, a heating treatment was performed at 120° C. for 15 minutes. Next, development was carried out using an aqueous solution of γ-butyrolactone to dissolve away an unexposed portion, thereby forming holes extending to the core. Thereafter, a heating treatment was performed at 100° C. for 15 minutes to form the over cladding layer. The thickness of the over cladding layer (a thickness as measured from the surface of the core) was 5 μm when measured with a contact-type film thickness meter. The refractive index of the over cladding layer at a wavelength of 830 nm was 1.542.

Thereafter, the material for the formation of the above-mentioned coating material (the coating layer) was applied to the surface of the above-mentioned over cladding layer by a spin coating method. Then, exposure by the use of irradiation with ultra violet light at 4000 mJ/cm$^2$ was performed from over the material for the formation of the coating material (the coating layer) Thereafter, a heating treatment was performed at 120° C. for 15 minutes to form the coating material filling the above-mentioned holes and the coating layer on the surface of the over cladding layer. The thickness of the coating layer (a thickness as measured from the surface of the over cladding layer) was 6 μm when measured with a contact-type film thickness meter. The refractive index of the coating material (the coating layer) at a wavelength of 830 nm was 1.588 because a base material for the formation of the coating material (the coating layer) was similar to that of the above-mentioned core. In this manner, an optical waveguide for a luminescent device was provided.

Example 2

A mixture of 5 parts by volume of fine particles of silicone resin (having a refractive index of 1.43) having an average particle size of 0.7 μm as light scattering particles in 100 parts by volume of the material for the formation of the above-mentioned core was used as the material for the formation of the coating material (the coating layer) in Example 1 described above. Except for this, Example 2 was similar to Example 1 described above. In this manner, an optical waveguide for a luminescent device was produced.

Example 3

The surface of the coating material (the coating layer) was roughened with sandpaper in Example 1 described above. Except for this, Example 3 was similar to Example 1 described above. In this manner, an optical waveguide for a luminescent device was produced.

Example 4

In Example 2 described above, the surface of the coating material (the coating layer) was roughened in a manner similar to that in Example 3 described above. Except for this, Example 4 was similar to Example 2 described above. In this manner, an optical waveguide for a luminescent device was produced.

Example 5

In Example 2 described above, the potting of the material for the formation of the coating material only in the holes formed in the over cladding layer was carried out to fill only the holes with the coating material. The coating layer was not formed on the surface of the over cladding layer. Except for this, Example 5 was similar to Example 1 described above. In this manner, an optical waveguide for a luminescent device was produced.

Light Emission Test

In the optical waveguides for a luminescent device according to Examples 1 through 5 thus obtained, a light receiving surface was formed by dicing near an end of the core. A manual alignment stage was used to align a red light emitting diode having a wavelength of 660 nm so that light enters the core. Thereafter, the red light emitting diode was fixed with an ultra violet curable resin. Then, when light was emitted from the red light emitting diode, the emission of the red light from the surface portion of the coating layer over the coating material (the holes formed in the over cladding layer) was observed in all Examples. In particular, the light emission in Examples 2 through 5 was better in visibility by visual observation. Further, the light emission in Examples 4 and 5 was much better in visibility by visual observation.

Furthermore, when the coating material in Examples 1, 3 and 4 was formed only in the holes formed in the over cladding layer in a manner similar to that in Example 5, results showing a trend similar to that described above were obtained.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a luminescent device comprising: a planar body, a planar core formed in a predetermined portion of a surface of the body, and a planar over cladding layer formed on the surface of said body so as to cover the core, wherein said over cladding layer includes a hole formed in a predetermined portion thereof and extending to the core, wherein said hole is completely filled with a coating material having a refractive index not less than that of said core, so that some of light beams propagating through the core pass through said coating material, and wherein light scattering particles are dispersed in the coating material filling said hole.

2. An optical waveguide for a luminescent device comprising: a planar body, a planar core formed in a predetermined portion of a surface of the body, and a planar over cladding layer formed on the surface of said body so as to cover the core, wherein said over cladding layer includes a hole formed in a predetermined portion thereof and extending to the core, wherein said hole is completely filled with a coating material having a refractive index not less than that of said core, so that some of light beams propagating through the core pass through said coating material, and wherein a surface of the coating material filling said hole is in the form of an uneven rough surface.

3. A method of manufacturing an optical waveguide for a luminescent device, comprising the steps of:
   forming a core in a predetermined portion of a surface of a planar body;
   forming a photosensitive resin layer on the surface of said body and then exposing the photosensitive resin layer to light, except where a hole is to be formed, to form an exposed portion of the photosensitive resin layer into an over cladding layer;
   removing an unexposed portion of the photosensitive resin layer to form a void resulting from the removal into the hole; and
   potting a coating material having a refractive index not less than that of said core into the hole and then hardening the coating material to fill said hole with the coating material,
   wherein light scattering particles are dispersed in the coating material filling said hole.

4. The method of manufacturing the optical waveguide for a luminescent device according to claim 3, further comprising the step of
   forming a coating layer on a surface of said over cladding layer and potting the coating material forming the coating layer into said hole to fill the hole with the coating material after said hole is formed.

5. The method of manufacturing the optical waveguide for a luminescent device according to claim 3, wherein a surface of the coating material filling said hole is in the form of an uneven rough surface.

6. The method of manufacturing the optical waveguide for a luminescent device according to claim 3, wherein said planar body is formed of an under cladding material or a metal material.

7. A method of manufacturing an optical waveguide for a luminescent device, comprising the steps of:
   forming a core in a predetermined portion of a surface of a planar body;
   forming a photosensitive resin layer on the surface of said body and then exposing the photosensitive resin layer to light, except where a hole is to be formed, to form an exposed portion of the photosensitive resin layer into an over cladding layer;
   removing an unexposed portion of the photosensitive resin layer to form a void resulting from the removal into the hole; and
   potting a coating material having a refractive index not less than that of said core into the hole and then hardening the coating material to fill said hole with the coating material,
   wherein a surface of the coating material filling said hole is in the form of an uneven rough surface.

8. The method of manufacturing the optical waveguide for a luminescent device according to claim 7, further comprising the step of
   forming a coating layer on a surface of said over cladding layer and potting the coating material forming the coating layer into said hole to fill the hole with the coating material after said hole is formed.

9. The method of manufacturing the optical waveguide for a luminescent device according to claim 7, wherein said planar body is formed of an under cladding material or a metal material.

* * * * *